Sept. 29, 1936.  O. M. OLSEN  2,055,700
METER CONNECTING DEVICE
Filed April 19, 1934
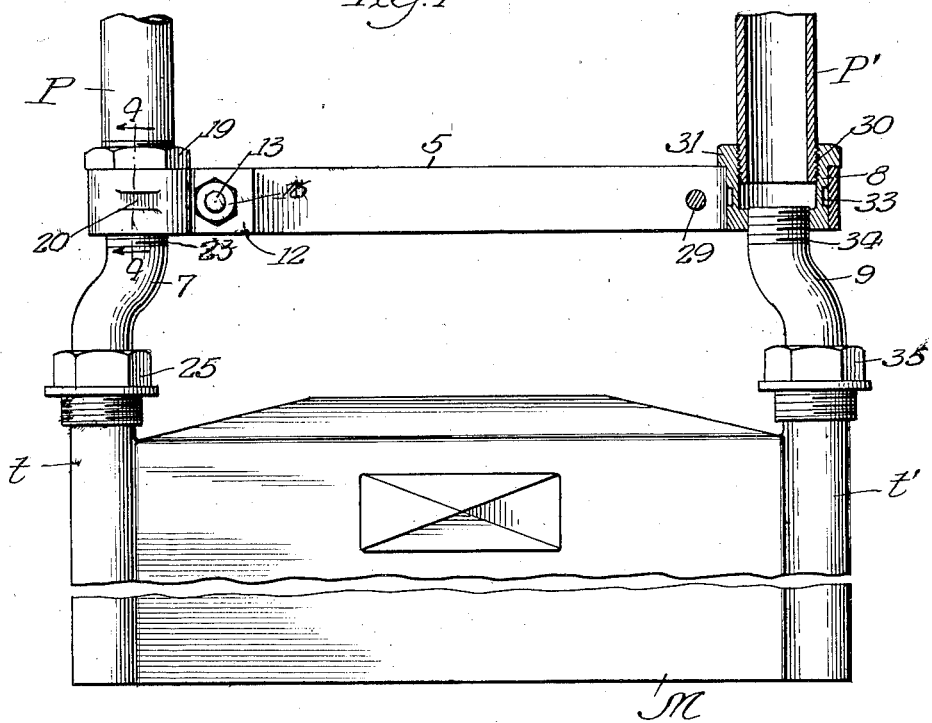
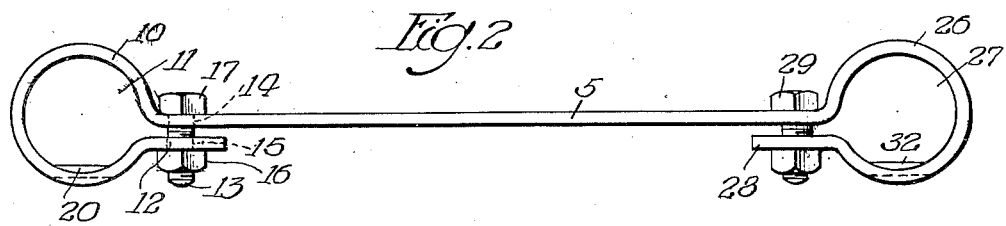
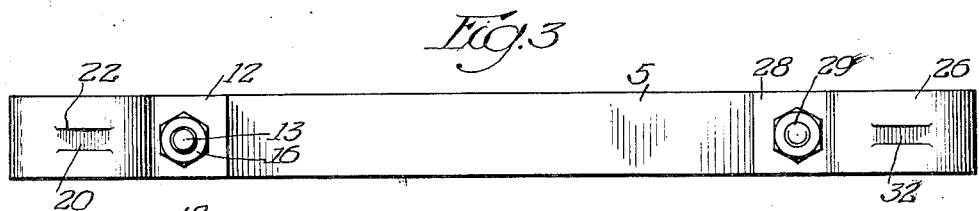
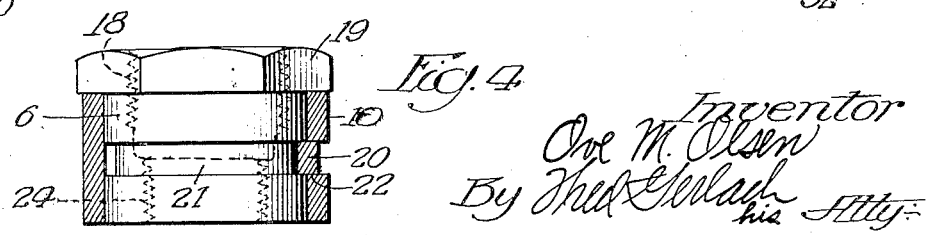

Patented Sept. 29, 1936

2,055,700

UNITED STATES PATENT OFFICE 2,055,700

METER CONNECTING DEVICE

Ove M. Olsen, Rockford, Ill., assignor to Garnet W. McKee, Rockford, Ill.

Application April 19, 1934, Serial No. 721,253

1 Claim. (Cl. 285—3)

The present invention relates generally to devices for use in connecting gas meters to gas supply and service pipes. More particularly, the invention relates to that type of meter connecting device which comprises (1) a rigid or non-adjustable crossbar which is adapted to extend horizontally and is provided at its ends with vertically extending open ended sockets; (2) a pair of sleeves which are rotatably mounted in the sockets respectively and have internal screw threads at their upper ends for connection to the gas pipes; and (3) a pair of off-set coupling nipples which are associated with and depend from the sleeves in the sockets at the ends of the crossbar and embody external screw threads at the upper ends thereof for connection to internal screw threads in the lower ends of the sleeves and coupling rings at their lower ends for connection to the tubes of the meter.

One object of the invention is to provide a meter connecting device of this type which is an improvement upon, and may be manufactured at a lower cost than, previously designed meter connecting devices of the same general character by reason of the fact that the crossbar is formed from strip steel and the sockets for supporting the sleeves rotatably are made by bending the ends of the crossbar into the form of resilient split rings.

Another object of the invention is to provide a meter connecting device of the last mentioned character in which the socket-forming rings at the ends of the strip steel crossbar are adapted by means of bolts which are carried by the crossbar and extend through the free ends of the rings, to be controlled or clamped around the sleeves in order to lock the same against rotation in the sockets after connection thereof to the gas pipes.

A further object of the invention is to provide a meter connecting device of the type and character here under consideration in which the sleeves embody annular or circumferential grooves in the outer peripheries thereof and are held in the sockets and against axial displacement by means of instruck portions on the rings.

A still further object of the invention is to provide a meter connecting device of the two sleeve, off-set coupling nipple type which may be manufactured cheaply and with precision and is exceedingly efficient in operation.

Other objects of the invention and the various advantages and characteristics of the present meter connecting device will be apparent from a consideration of the following detailed description.

The invention consists in the several novel features which are hereinafter set forth and are more particularly defined by the claim at the conclusion hereof.

In the drawing which accompanies and forms a part of this specification or disclosure and in which like numerals of reference denote corresponding parts throughout the several views:

Figure 1 is a view partly in side elevation and partly in section of a meter connecting device embodying the invention;

Figure 2 is a plan view illustrating in detail the shape and construction of the socket-forming rings at the ends of the crossbar and the manner in which the bolts serve to contract the rings in order to lock the sleeves against rotation in the sockets after connection thereof to the gas pipes;

Figure 3 is a side view of the device; and

Figure 4 is an enlarged vertical section taken on the line 4—4 of Figure 1 and showing in detail the manner in which the instruck portions of the socket-forming rings coact with the annular or circumferential grooves in the outer peripheries of the sleeves to hold the sleeves in the sockets and against axial displacement with respect to the rings.

The meter connecting device which forms the subject matter of the invention is adapted for use in connecting a gas meter to a gas supply pipe P and a service pipe P'. The meter as shown in Figure 1 of the drawing is of standard construction and embodies a vertically extending inlet tube $t$ at one side thereof and a vertical outlet tube $t'$ at its other side. The tubes $t$ and $t'$ are formed integrally with the casing of the meter and are provided at their upper ends with external screw threads.

The device comprises a one piece, horizontally extending crossbar 5, a vertically extending sleeve 6 and a depending coupling nipple 7 at one end of the crossbar, and a vertically extending sleeve 8 and a depending coupling nipple 9 at the other end of the crossbar 5. The sleeve 6 and the nipple 7 at the said one end of the crossbar, that is, at the inlet end of the bar are adapted as hereinafter described to connect the inlet tube $t$ of the meter M to the gas supply pipe P for the delivery of gas from the pipe to the meter. The sleeve 8 and the coupling 9 at the other end of the crossbar, that is, at the outlet end of the bar serve as a connection between the outlet tube of the meter and the service pipe P′ and to conduct gas from the meter to the service pipe.

The crossbar 5 is formed from strip steel and is bent at the inlet end thereof so as to form an integral, resilient, split ring 10 for supporting rotatably the sleeve 6. This ring is truly circular in conformation and forms a vertically extending, open ended, cylindrical socket 11 for the sleeve. The free end of the ring 10 is provided with an integral, inwardly extending straight extension-piece 12. The latter extends alongside of, and in parallel relation with respect to, the adjacent end portion of the crossbar and is spaced from the latter so that the ring 10 may be contracted as hereinafter described for sleeve locking purposes. A bolt 13 is carried by the inlet end of the crossbar. This bolt extends through a hole 14 in the said inlet end of the crossbar and an aligned hole 15 in the extension-piece 12 and embodies a nut 16 at one end thereof and a head 17 at its other end. When the nut 16 is tightened the extension-piece 12 is drawn or forced towards the adjacent end portion of the crossbar with the result that the ring 10 is contracted around the sleeve 6, and holds or locks the latter against rotation in the socket 11.

The sleeve 6 is preferably in the form of a malleable iron casting. It is cylindrical and fits accurately in the socket in the ring 10. The upper end of the sleeve embodies an internal screw thread 18 for connection to the gas supply pipe P. It also embodies an outwardly extending polygonal flange 19 whereby it may be gripped by a wrench or similar turning tool and turned into connected relation with respect to the gas supply pipe P. The sleeve is adapted to be connected to the pipe by rotation relatively thereto either while it is in the socket 11 or when it is removed from the socket. After connection of the sleeve to the pipe the sleeve is locked against rotation in the socket by contracting the ring through the medium of the bolt 13. The sleeve is held against axial displacement in the socket 11 by means of an instruck portion 20 in one side of the ring 10. This instruck portion is adapted to fit within an annular or circumferential groove 21 in the central portion of the outer periphery of the sleeve and is formed by making two parallel slits 22 in the ring 10 and then deflecting or striking inwardly the portion of the ring between the two slits. The instruck portion 20 is comparatively shallow so that it is possible readily to insert the sleeve 6 into the socket when the nut 16 is in a loosened state on the shank of the bolt 13.

The coupling nipple 7 is of the "off-set" variety and embodies at its upper end an external screw thread 23 by which it is connected to an internal screw thread 24 in the lower end of the sleeve 6. The lower end of the nipple is provided with a coupling ring 25 for connection to the external screw thread on the upper end of the inlet tube t of the meter M.

The outlet end of the crossbar 5 is bent to form an integral, resilient, split ring 26. This ring serves as a support for the sleeve 8 and defines a vertically extending, open ended, cylindrical socket 27. The free end of the ring embodies an inwardly extending, extension-piece 28 which faces the extension piece 12 of the ring 10 and is slightly spaced from the adjacent end portion of the crossbar so that the ring 26 may be contracted. A bolt 29 extends through aligned holes in the extension-piece 28 and the adjacent end portion of the crossbar and operates to contract the ring 26 for sleeve locking purposes.

The sleeve 8 is the same in construction and design as the sleeve 6 and embodies at its upper end an internal screw thread 30 for connection to the gas service pipe P′. It also embodies at its upper end an outwardly extending polygonal flange 31 for turning purposes. The sleeve is normally held in the socket 27 against axial displacement by means of an instruck portion 32 on the ring 26. This instruck portion coacts with an annular or circumferential groove 33 in the central portion of the outer periphery of the sleeve 8 and is formed similarly to the instruck portion 20 on the ring 10.

The coupling nipple 9, like the nipple 7, is of the "off-set" variety. It embodies an external screw thread 34 at its upper end whereby it is connected to an internal screw thread in the lower end of the sleeve 8. The lower end of the nipple 9 is provided with an internally threaded coupling ring 35 for connection to the externally upper end of the outlet tube t of the meter M.

The device is assembled by first loosening the nuts on the bolts 13 and 29 so as to release the sleeves 6 and 8 for rotation in the sockets in the rings at the ends of the crossbar 5. Thereafter the sleeves are turned by a wrench or similar turning tool into connected relation with the gas pipes P and P′ and are then locked in the sockets by tightening the nuts on the bolts. Tightening of the nuts as previously pointed out results in the rings being contracted around the sleeves so as to lock the latter in place. After connection of the sleeves to the gas pipes, the coupling nipples 7 and 9 are inserted into and connected to the lower ends of the sleeves and then the coupling rings are attached to the meter tubes by turning them into screw threaded engagement with external screw threads on the upper ends of the tubes. By virtue of the fact that the coupling nipples are of the "off-set" variety one may be swung or adjusted relatively to the other in order to space the coupling rings for attachment to the meter tubes. The device may also be assembled by removing the sleeves 6 and 8 from the sockets in the rings in the ends of the crossbar and connecting them to the gas supply and service pipes P and P′. After connection to the pipes the sleeves are inserted back into the sockets by shifting the crossbar 5 upward. Due to the resiliency of the rings the instruck portions 20 and 32 do not interfere with insertion of the sleeves into the sockets in the rings.

The herein described meter connecting device may be manufactured at a low and reasonable cost due to the fact that the crossbar and the socket-forming rings for the sleeves are formed from a single piece of strip steel. The device as a whole lends itself to precision manufacture and is efficient in operation due to the fact that the crossbar and the rings are capable of withstanding sharp blows without likelihood of fracture.

The invention is not to be understood as restricted to the details set forth, since these may be modified within the scope of the appended claim, without departing from the spirit and scope of the invention.

Having thus described the invention, what I claim as new and desire to secure by Letters Patent, is:

As a new article of manufacture, a device adapted for use in connecting the tubes of a gas meter to a pair of gas pipes and comprising a horizontal crossbar formed of a single piece of metal and having the ends thereof shaped to form integral, substantially truly circular, split resilient rings with inwardly extending, crossbar lapping, extension pieces at the free ends thereof, a pair of vertically extending sleeve-members provided at their lower ends with means for connection to the meter tubes and at their upper ends with internal screw threads for connection to the gas pipes and also with outwardly extending flanges for turning purposes and adapted to be connected to the pipes and then inserted into the rings by shifting the bar upwards towards the pipes, bolts extending through the extension pieces and the contiguous portions of the ends of the crossbar for contracting the rings around the sleeve-members so as to lock the latter against rotation in the rings, and means associated with the rings for holding the sleeve members against axial displacement after insertion in said rings.

OVE M. OLSEN.